(12) United States Patent
McMullen et al.

(10) Patent No.: US 6,727,617 B2
(45) Date of Patent: Apr. 27, 2004

(54) METHOD AND APPARATUS FOR PROVIDING THREE AXIS MAGNETIC BEARING HAVING PERMANENT MAGNETS MOUNTED ON RADIAL POLE STACK

(75) Inventors: Patrick T. McMullen, Long Beach, CA (US); Co Si Huynh, Alhambra, CA (US)

(73) Assignee: Calnetix, Cerritos, CA (US)

( * ) Notice: Subject to any disclaimer, the term of this patent is extended or adjusted under 35 U.S.C. 154(b) by 0 days.

(21) Appl. No.: 10/078,572

(22) Filed: Feb. 20, 2002

(65) Prior Publication Data

US 2003/0155829 A1 Aug. 21, 2003

(51) Int. Cl.[7] ................................................ H02K 7/09
(52) U.S. Cl. ...................................................... 310/90.5
(58) Field of Search ................................... 310/90.5, 90

(56) References Cited

U.S. PATENT DOCUMENTS 6,130,494 A * 10/2000 Schob ........................ 310/90.5

* cited by examiner

Primary Examiner—Burton Mullins
(74) Attorney, Agent, or Firm—Irving Keschner

(57) ABSTRACT

An improved magnetic bearing that uses permanent magnets to provide the bias flux. The magnetic circuits generating the control flux and bias fluxes are substantially non-coincident but share the same path over some portions that include radial and axial airgaps allowing for a low reluctance and an efficient path for the electromagnetic flux. The flux paths of the permanent magnets are completely defined with minimized airgaps for achieving higher forces and efficiency and very low control currents that produce extremely large forces. A single coil and amplifier for the axial force control and two coils with one associated amplifier for each radial axis of control provides simplicity and cost effectiveness. A single thrust disk is provided that is reacted against for both radial and the axial displacement. The permanent magnets used in the present invention are first fabricated and axially magnetized as segments or as continuous rings prior to being mounted on the sides of the rotor pole, providing an effective and inexpensive technique of manufacturing magnetic bearings.

8 Claims, 6 Drawing Sheets

METHOD AND APPARATUS FOR PROVIDING THREE AXIS MAGNETIC BEARING HAVING PERMANENT MAGNETS MOUNTED ON RADIAL POLE STACK

BACKGROUND OF THE INVENTION

1. Field of the Invention

The present invention provides a three-axis magnetic bearing utilizing a permanent magnet to generate the bias flux and wherein the magnets are mounted to the face of the pole stack.

2. Description of the Prior Art

Copending application Ser. No. 09/865,015 filed May 23, 2001, invented by the inventor of the instant application, discloses and claims a magnetic thrust bearing using a single coil and linear amplifier and a single thrust desk. The design set forth in the copending application does not utilize permanent magnets, and more specifically, axially magnetized permanent magnets that are not attached to the rotor, for reduced cost and simplified construction when compared to existing thrust bearings.

Although the design set forth in the copending application provides significant advantages over the prior art designs described therein, it is desirable to provide a magnetic bearing wherein magnetized permanent magnetic members are utilized to provide the magnetic field for both the radial and axial axes to allow for radial and axial shaft position control. However, the system set forth in the copending application does not allow for active radial position control. Current techniques for manufacturing magnetic bearings using radial magnetized permanent magnets require costly and difficult assembly and alignment procedures.

What is desired therefore is to provide a magnetic bearing that utilizes axially magnetized permanent magnets wherein the fabrication, assembly and installation of the permanent magnets to the stationary stator is accomplished in a simple and inexpensive manner.

SUMMARY OF THE PRESENT INVENTION

The present invention provides an improved magnetic bearing that uses permanent magnets to provide the bias flux with electromagnetic coils providing the control flux, bias flux being a constant magnetic flux which energizes the bearing airgaps. The control magnetic flux adds flux from one pole and subtracts flux from the opposite axis pole to produce a net force on a target piece located on the bearing shaft. Bias magnetic field is present to allow for linear control of force using the control input current, the input current being converted to magnetic flux by the control electromagnets in the magnetic bearing. Providing bias magnetic flux using permanent magnets reduces the required bearing input power (by eliminating a bias electromagnet) and provides a highly linear magnetic bias field in the airgap throughout the bearing radial and axial airgaps. The magnetic circuits generating the control and bias fluxes are substantially non-coincident but share a path over some portions that include radial and axial airgaps, allowing for a low reluctance, efficient path for the electromagnetic flux. The flux paths of the permanent magnets are completely defined with minimized airgaps for achieving higher forces, small size and minimum cost. The non-coincident control flux path allows for very low control currents to produce extremely large forces very efficiently. A single coil and amplifier for control of the axial force and two coils with one associated amplifier for each radial axis of control provides simplicity and cost effectiveness. A single target disk is utilized and is reacted against for both radial and axial forces. Radially magnetized permanent magnets are not required and permanent magnets are not attached to the rotor. The permanent magnets used in the present invention are first fabricated and then axially magnetized as square segments or as a ring prior to being mounted on the sides of the stator central pole, providing an effective and inexpensive technique for manufacturing magnetic bearings.

DESCRIPTION OF THE DRAWING

For a better understanding of the present invention as well as other objects and further features thereof, reference is made to the following description which is to be read in conjunction with the accompanying drawing therein.

DESCRIPTION OF THE INVENTION

The following sets forth the general operating principles of a magnetic thrust bearing of the type disclosed in U.S. Pat. No. 5,514,924 to place the present invention in proper perspective. The teachings of the '924 patent and copending application Ser. No. 09/865015 necessary for an understanding of the present invention is incorporated herein by reference.

Figure 1:
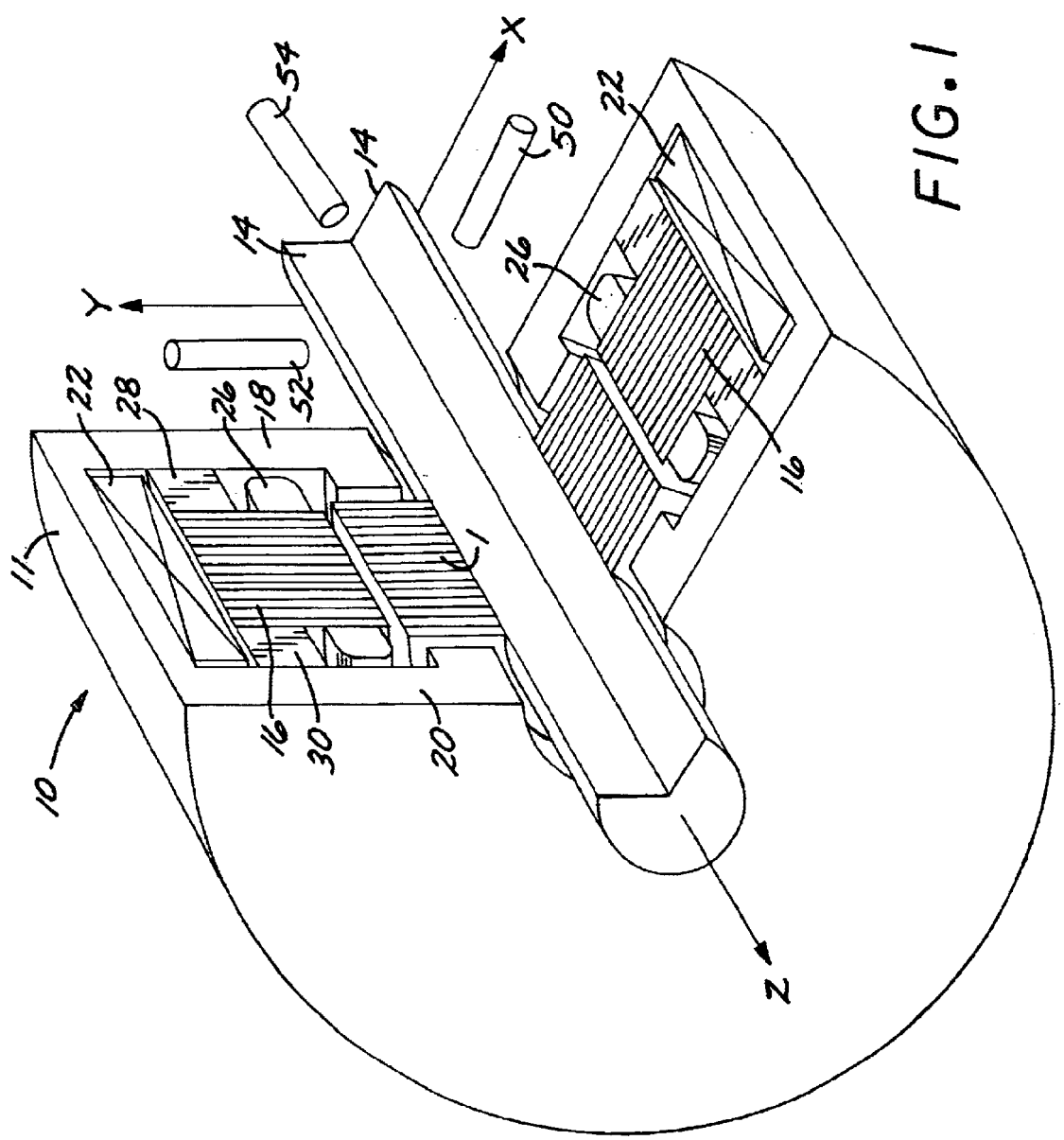
FIG. 1 is a partial, sectional perspective view of a magnetic bearing embodying the invention.
Figure 2:
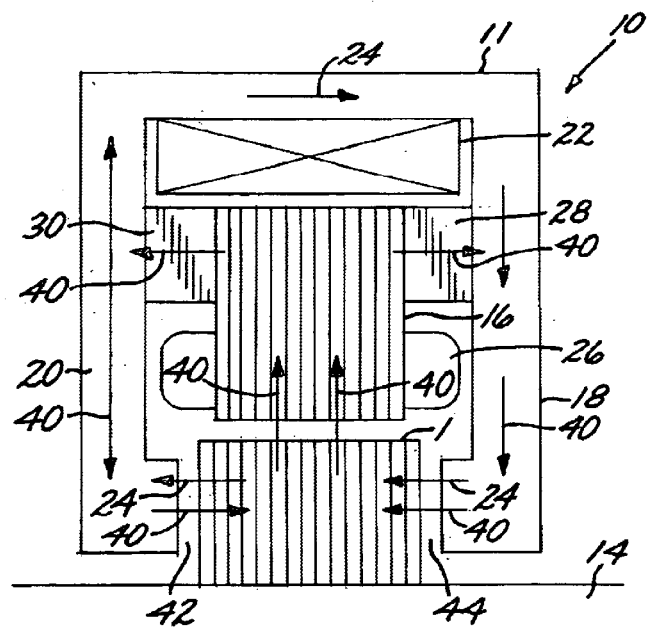
FIG. 2 is an enlarged fragmented sectional view of the magnetic bearing shown in FIG. 1 illustrating the axial control magnetic flux path and the bias magnetic path in that plane.
Figure 3:
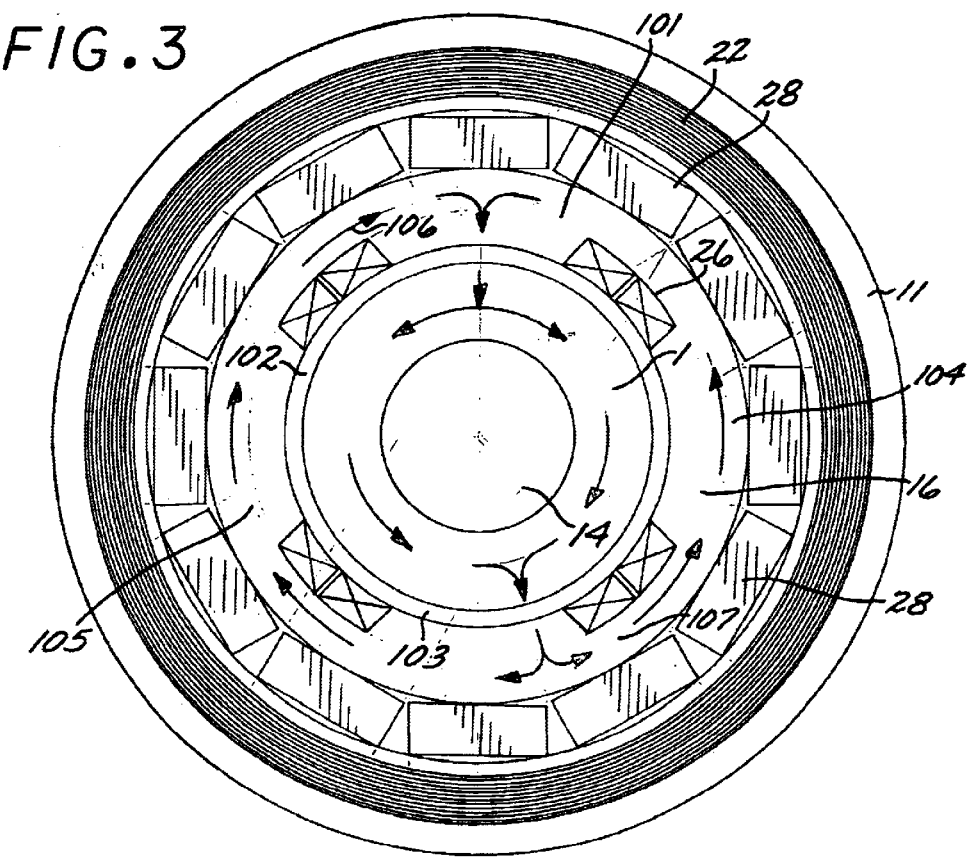
FIG. 3 is a reduced sectional elevational view of the magnetic bearing shown in FIG. 2 illustrating the radial control magnetic flux path and the portion of the bias magnetic path in that plane.

Referring now to FIGS. 1–3, the magnetic flux 40 generated by the permanent magnets 28 and 30 in the magnetic thrust bearing 10 of the present invention is directed axially through axial air gaps 42 and 44 to provide axial magnetic flux coupling of the shaft 14 to the stator assembly 11. Similarly, the magnetic flux 40 is then directed radially through the radial airgaps to provide radial magnetic flux coupling of the rotor disk 1 to the stator assembly 11. The rotor disk 1 is mechanically attached to the shaft 14 to effectively transmit forces applied to disk 1 to the shaft 14.

The active radial control electromagnet coils 26 positioned on the radial pole assembly 16 and about shaft 14 are controlled by a servo circuit (not shown) to produce a high stiffness restoring force that keeps the shaft 14 precisely centered radially between the radial pole assembly 16. The electromagnet coils 26 generate a radially polarized, controllable electromagnetic field 106.

The active axial control electromagnetic coil ring 22 positioned in the stator assembly radially outward of the radial pole assembly 16 and about the shaft 14 is controlled by a servo circuit (not shown) to produce a high stiffness restoring force that keeps the shaft 14 precisely centered axially relative to the opposite ends of the axial stator poles, 18 and 20. The electromagnetic coil 22 generates an axially polarized, controllable electromagnetic field 24.

An X-axis position sensor 50 and a Y-axis position sensor 52 are provided for sensing, respectively, X and Y-axis displacement of the shaft 14 relative to the stator assembly 11. The purpose of the sensors is to detect movement of the shaft 14 radially from its optimal centered position. When the position sensors detect an eccentricity of the shaft 14, they generate electrical signals to a servo circuit which, upon receipt of such input signals, provides a restoring force by generating a signal to the active control electromagnets 26 in such a manner so as to reposition the shaft 14 in its optimal centered position. When Z-axis position sensor 54 detects displacement of the shaft 14 along the Z-axis, it causes generation of electrical input signals to the servo circuit which, upon receipt of such input signals, provides a restoring force by generating a signal to the active control electromagnet coil ring 22 in such a manner so as to reposition the shaft 14 in its optimal axial position.

With the foregoing basic construction of the magnetic bearing 10 set forth, the function thereof will now be described in greater detail. The permanent magnet segments 28 and 30 (only one of a plurality of segments are illustrated) generate a magnetic field having a magnetic flux path illustrated by the arrows having a reference number 40 as set forth hereinabove. These paths have minimum airgaps for the magnetic flux to cross to minimize their size and cost. The permanent magnets generate a relatively constant, high density magnetic flux which is used by both the radial and axial (thrust) axes for the bias field. This bias field is typically set at half the maximum magnetic field to allow achievement of maximum force capacity for each axis of the bearing for support of the shaft 14 to suspend or levitate the shaft within the stator assembly, or housing, 11. This maximum force is realized when the control field is combined with the bias field to result in the maximum field on one pole of an axis, and on the opposite pole of the same axis is combined to result in a net zero field.

The radial axes X and Y are controlled by adding current to the axes coils 26 to produce a magnetic flux. The radial axes 16 poles are constructed using thin electrical steel layers, called laminations, bonded together to minimize stator losses and maximize axis response for high frequency. For two axes of control, four stator poles 16 are needed (two poles per axis). The rotor disk 1 does not have poles, and is a continuous, smooth surface for the radial stator pole assembly 16 to act against when it is spinning. The two stator poles 16 for an axis are opposing each other to form the appropriate magnetic field path. This radial control field 106, shown in FIG. 3 for one of these radial axes, flows from upper stator radial pole 16 (illustrated by reference numeral 101 for clarity) through air gap 102, through the rotor target 1, through the opposite pole air gap 103, into the opposite, or lower, radial stator pole 107, and returns via the stator back irons 104 and 105. This path is very low reluctance to minimize the coil current required and input power, the only path location that is not low reluctance iron being the opening air gaps 102 and 103. With the addition of the bias field 40 in the radial axes air gaps, it can be seen that the radial control field 106 adds to this magnetic field in gap 102 and reduces the magnetic field in gap 103 on the rotor target 1 to apply a controlled force to the rotor target 1. Critical to the efficient operation is the fact that the coil flux is not required to pass through the high reluctance permanent magnet segments 28 and 30, minimizing the required current to produce force.

Figure 4:
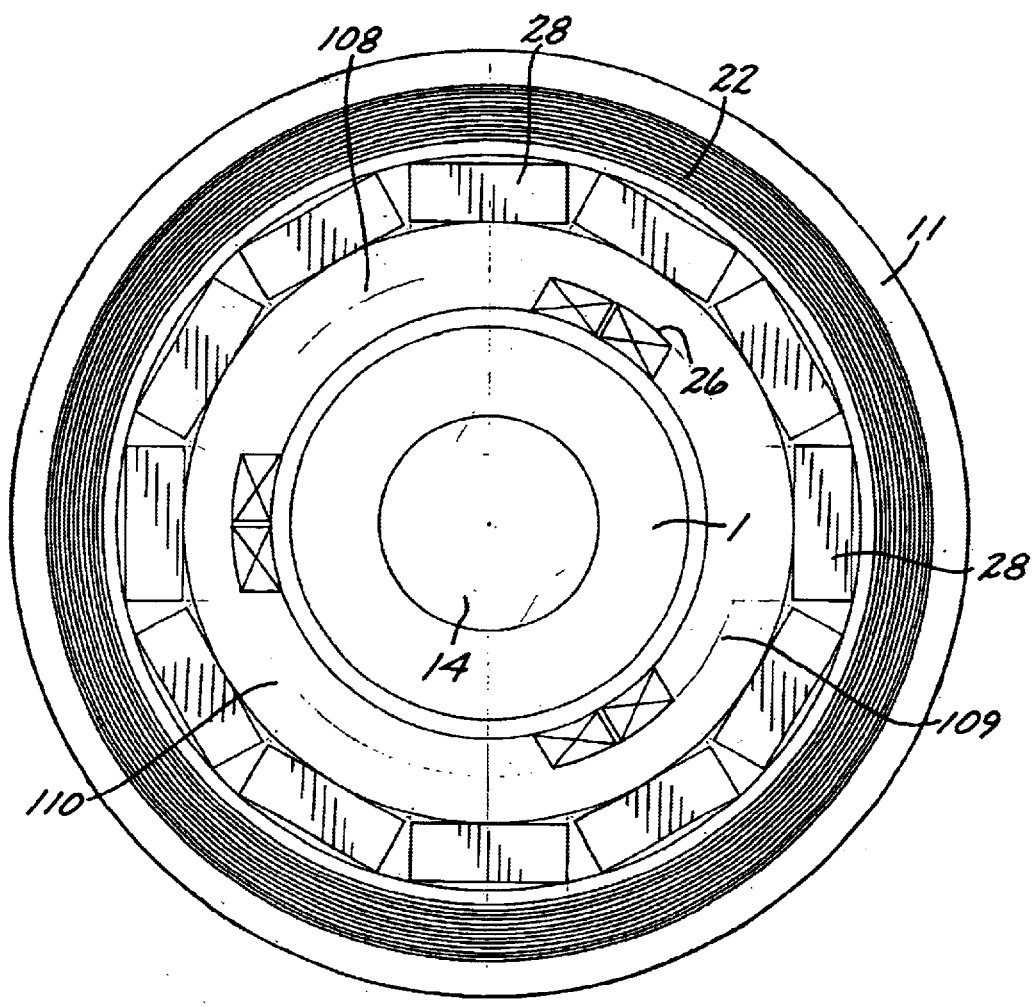
FIG. 4 illustrates an alternate version of the magnetic bearing using three poles.

An alternate construction for the radial pole is shown in FIG. 4 and uses three distinct radial poles 108, 109 and 110 for controlling the two radial axes (note that the same reference numeral identifies identical components in each of the figures). These axes, instead of being controlled in a Cartesian coordinate system, are controlled in a polar coordinate system using angular position and radial displacement. While affecting the radial axes control and the radial pole construction, this arrangement does not affect the axial pole system and its control, or the permanent magnet bias system and its construction. Using a rotational position sensor, such as an optical encoder, and a set of radial position sensors, a polar coordinate controller can provide radial position control. This system, although having more difficulty in acquiring and estimating angular position and radial displacement, offers the advantage of using a three phase current driver that is typically used for motor current driving applications, reducing the amplifiers required for the radial axes from two (X and Y) to one.

Referring back to the system operation described with reference to FIGS. 1–3, the axial axis is controlled by adding current to the axial coil 22 to produce magnetic flux 24. The axial poles 18 and 20 are constructed using solid electrical steel. This axis typically does not require high frequency force response, with solid machined steel minimizing construction costs. For one axis of control, two stator poles 18 and 20 are used. The rotor 1 does not have poles, and is a continuous, smooth surface for the axial stator poles 18 and 20 to act against when it is spinning. The two stator poles 18 and 20 for an axis are opposing each other to form the appropriate magnetic field path. This flux path 24, shown in FIG. 2, flows from one axial pole 18, through the air gap 44, through the rotor disk 1, through the air gap 42, into the opposite axial pole 20, and returns via the stator axial iron path 11. This path is very low reluctance to minimize the coil current required and input power, as the only path location that is not low reluctance iron is the operating air gaps 42 and 44. With the addition of the bias field 40 in the axial axis air gap 42 and 44, it can be seen that the axial control field 24 adds to this magnetic field in one gap 44, and reduces the magnetic field in the opposite air gap 42, thereby producing a net difference in the field, and consequently force, on the rotor target 1 to apply a controlled force to the rotor disk 1. Critical to the efficient operation is the fact that the coil flux 24 is not required to pass through the high reluctance permanent magnet 28 and 30, minimizing the required current to produce force.

The magnetic bearing 10 of the present invention is thus controlled by a three-axis servo control system which utilizes two position sensors to detect radial displacement of the shaft 14 and one additional sensor to detect axial displacement.

In use, the magnetic field generated by the permanent magnets tend to cause the shaft 14 to displace from a true centered position and into engagement with the rotor target 1. Such displacement is sensed by the X-axis and Y-axis position sensors which provide input to a servo circuit. The servo circuit selectively controls electrical current to the active control electromagnet coils 26 to position the rotor target 1 in essence providing a positive gradient which keeps the shaft 14 in a true radially centered position. Thus, a high density magnetic field is produced through the radial air gaps, which produces a radial force system which is metastable when the shaft 14 is centered within housing 11.

Similarly, the magnetic field generated by the permanent magnets also tend to cause the shaft 14 to displace from a true axially centered position and cause the rotor target 1 to move into engagement with axial stator poles 18 or 20. Such displacement is sensed by the Z-axis position sensor 54 which provides input to the servo circuit. The servo circuit selectively controls electrical current to the active control electromagnet coil 22 in order to provide a positive gradient which keeps the rotor target 1 properly spaced from the axial stator poles 18 or 20, thus centering the shaft 14. Thus, a high density magnetic field is produced through the axial air gaps, which produces an axial force system which is meta-stable when the rotor target 1 is equidistantly spaced from opposite ends of the axial stator pole.

The permanent magnets provide a high density magnetic field through both the radial air gap and the axial air gap, which is necessary to support the shaft 14 in a levitated or suspended position within the housing 11. The active control electromagnet coils 22 and 26 provide for stabilization of the shaft 14 resulting in an efficient bearing structure.

FIGS. 1–3 show a preferred configuration of the magnetic bearing 10 of the present invention. A target assembly 1 is attached to the shaft 14 and is acted upon by a radial set of poles 16 and two opposed axial set of ferrous poles 18 and 20. A single coil 22 provides the axial control flux indicated by reference arrow 24, while four coils (a single coil 26 is illustrated) provide the radial control flux. Each two opposing radial coils act together to result in a net force applied in the radial direction to the target assembly. Two axially magnetized permanent magnet members, 28 and 30, provide the bias flux for all axial and radial axes. The magnet 28 is preferably made of a plurality of magnetic segments as shown in FIG. 3 and not a complete, or continuous, ring, mounted in a sequential, continuous manner to the stator pole structure 16. The yokes can also be segmented (note that permanent magnet 30 is also preferably segmented).

The permanent magnet segments 28 are first manufactured as extruded or sintered blocks of magnetic material and then cut to the desired dimension, with square segments optimizing the utilization of the material for minimum cost. These segments are then ground as a group to the final dimension, magnetized and bonded, using adhesive, to the stator pole assembly 16. This simple use of square segments to form an effective ring of axially magnetized material to provide the bias flux significantly reduces assembly time, complexity, and cost over radially magnetized pieces. Tolerances are difficult to hold for permanent magnet material if the segments are ground. By eliminating the segments from the radial alignment path, tolerances in manufacturing can be reduced. The use of individual and separate square segments 28 (the segment face 28 shown in FIG. 1 is square shaped), as opposed to an segment formed in an arc from multiple square segments bonded together and machined, reduces cost and eases assembly. A grinder is then utilized to grind the sections to a desired size and the sized segments are then finally cut to the predetermined segment size and shape and then magnetized. The segments are then affixed to the side face of the stator poles during assembly using adhesive. Manufacturing the segments prior to magnetization enables the overall magnetic thrust bearing manufacturing process to be substantially reduced in cost. As noted above, continuous rings, initially unmagnetized, can be used for the permanent magnets 28 and 30.

Figure 5:
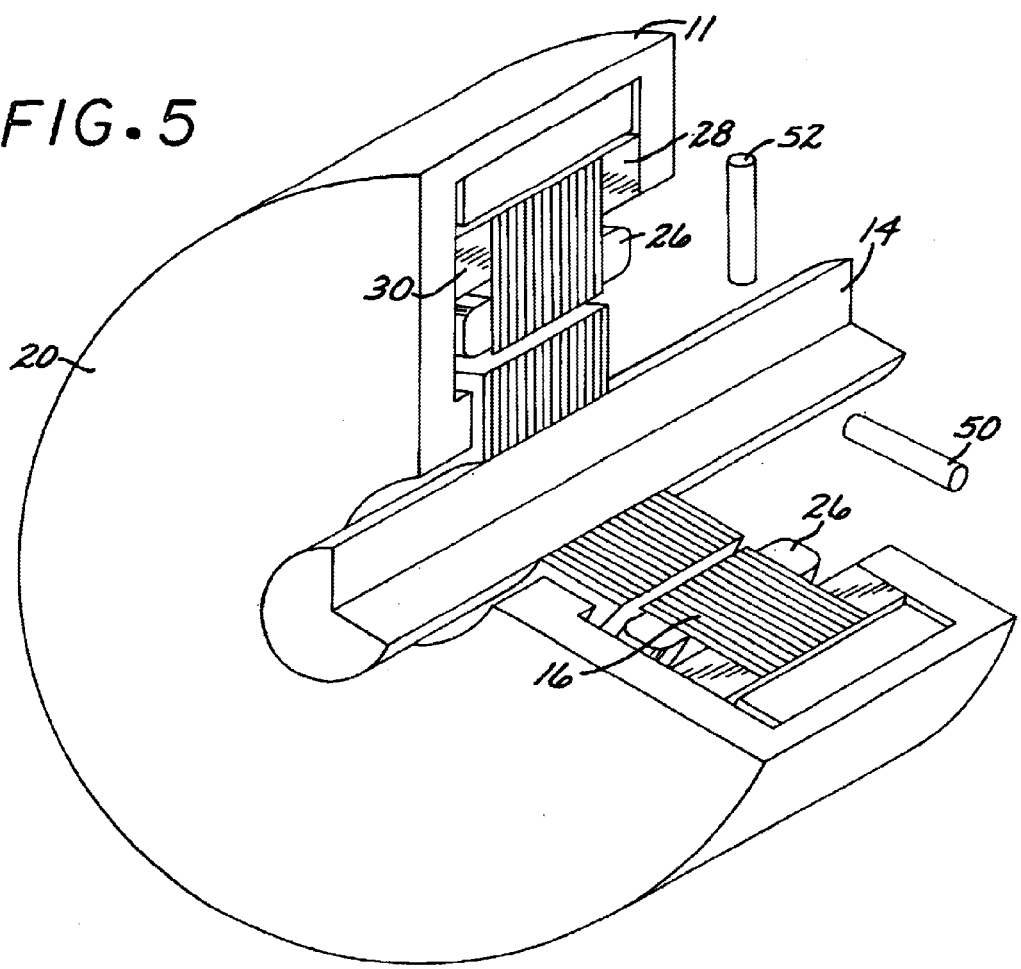
FIGS. 5 and 6 illustrate an alternate version of the magnetic bearing without the axial control coil and with one axial pole.
Figure 6:
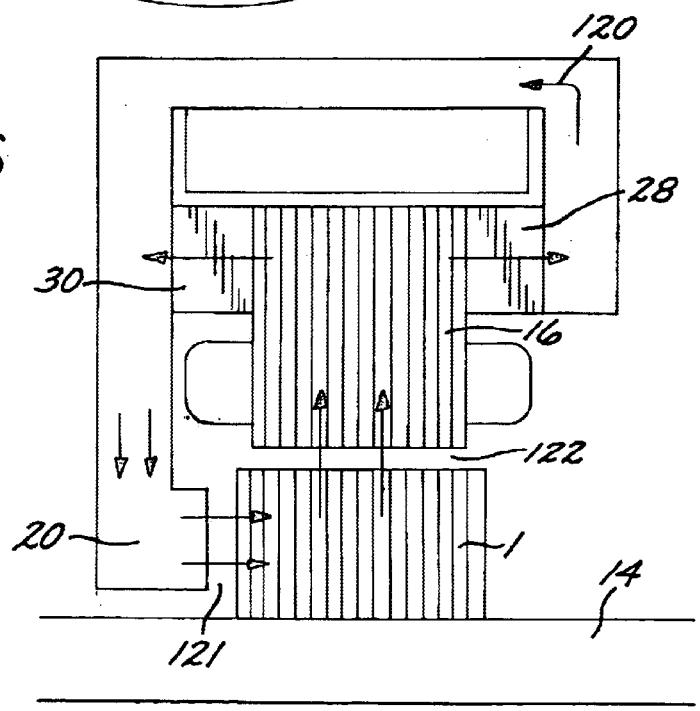

The present invention also contemplates further alternative configurations that utilize the core axial permanent magnet segments 28 and 30. One such version provides active radial position control and passive, one direction axial force and is illustrated in FIGS. 5 and 6. This version utilizes the same permanent magnet construction and the same radial pole and coil construction described above, but without the axial control coil and with one axial pole 20. The permanent magnet bias path 120 would pass from the axial stator pole 20, through the air gap 121 to the rotor target 1, through the radial air gap 122 to the radial stator pole 16 and back to the magnets 28 and 30. With the one axial stator pole 20 providing the permanent magnet bias field 120, a high axial force on the rotor disk 1 is produced. This force would be constant in one direction and could not be increased or decreased. The radial axes would operate as described in the configuration shown in FIGS. 1–3. A two axis controller is required to control the radial axes. This type of system is useful in applications that had known axial loads that were constant, such as expanders, compressors, and flywheels.

Figure 7:
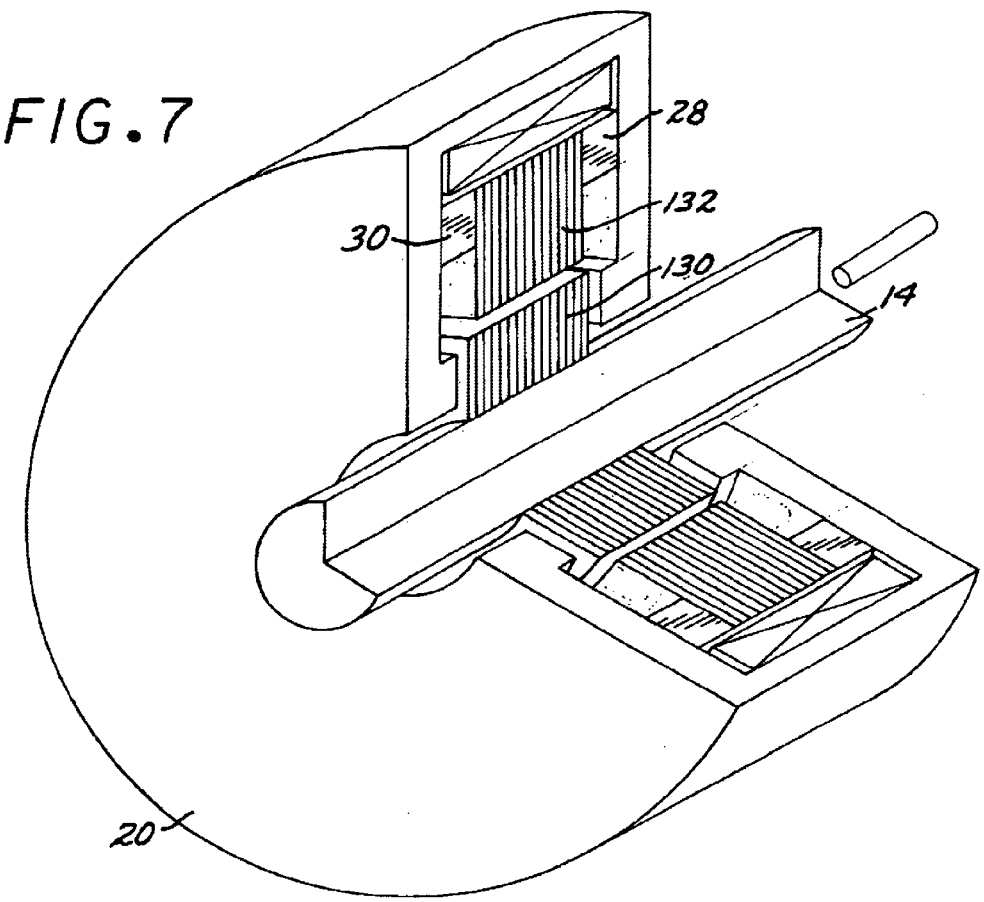
FIGS. 7–9 illustrate another version of the magnetic bearing without the radial control coil and distinct poles.
Figure 8:
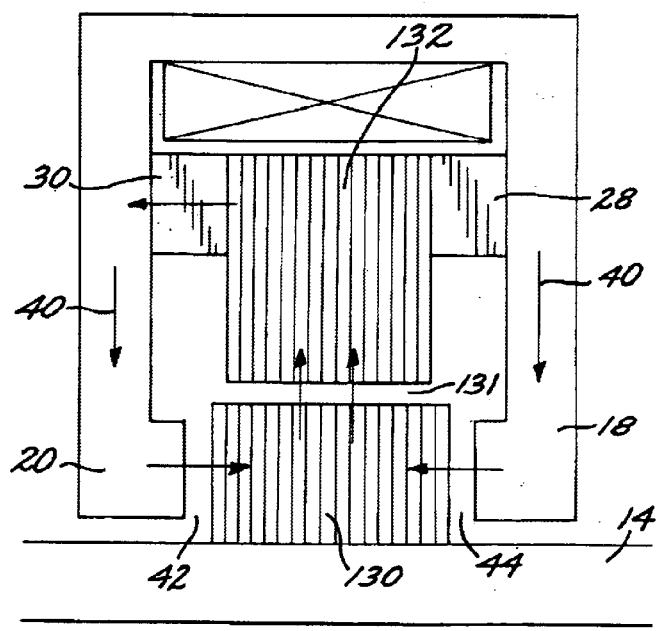
Figure 9:
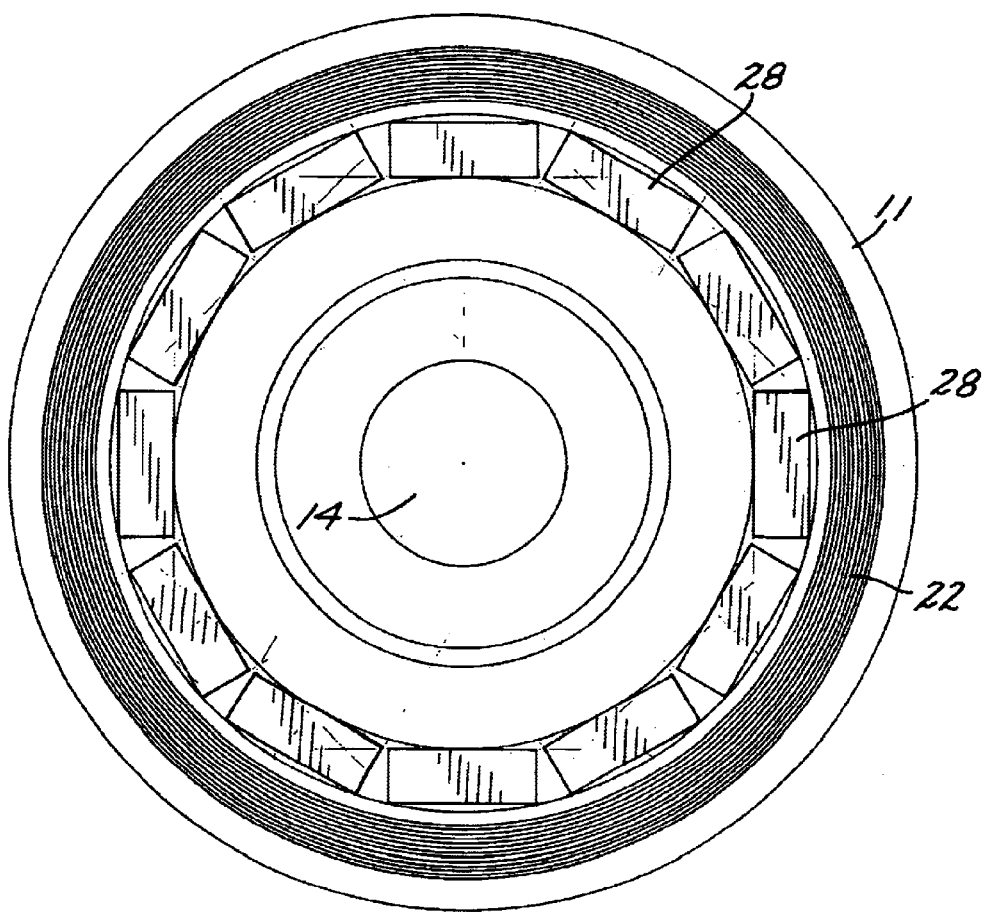

Another version of the present invention that provides active axial control and no radial control is shown in FIGS. 7-9. This version utilizes the same permanent magnet construction and the same axial pole and coil construction described in the configuration shown in FIGS. 1–3 but without the radial control coil and the distinct poles. The permanent magnet bias path 40 passes through the axial poles 18 and 20, through the axial airgaps 44 and 42 into the rotor target 130, and radially out through the radial air gap 131 to the radial ring 132. The radial ring 132 and rotor target 130 are constructed of solid electrical steel in the form of a continuous ring. The axial axis would operate as described in the embodiment disclosed in FIGS. 1-3. This construction provides an active axial bearing only, while offering the benefits of axial permanent magnet bias for low cost and simple construction. A one axis controller is required to control the axial axis. This type of system would be useful in applications that had large axial loads that were disproportionate to the radial loads, such as expanders, compressors and turbines.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A magnetic bearing for supporting a rotatable member including integrated thrust and rotor poles positioned with respect to a stationary member comprising:

first magnetic field generating means for generating an axially polarized magnetic field linked magnetically through first and second air gaps between the rotatable member and the stationary member, the first axially polarized magnetic field generating means comprising first and second accurate members of high magnetic permeability and a single controllable electromagnetic coil circumferentially positioned about said first and second actuate members and radially spaced from the rotatable member, said first and second arcuate members each comprising a plurality of separate magnetic segments; and a single radial pole assembly for generating a radially polarized magnetic field and being linked magnetically to the rotatable member through an air gap between the thrust disc and a radial pole assembly to provide radial magnetic flux coupling of the rotatable member to the stationary member.

2. The magnet bearing of claim 1 wherein said axially polarized magnetic field flows through first and second axial poles.

3. The magnetic bearing of claim 1 wherein the magnetic segments comprising said first arcuate members are affixed to the sides of said first axial pole and magnetic segments comprising said second arcuate members are affixed to the sides of said second axial pole.

4. A magnetic bearing for supporting a rotatable member including a integrated thrust and rotor poles positioned with respect to a stationary member comprising:

first magnetic field generating means for generating an axially polarized magnetic field linked magnetically through first and second air gaps between the rotatable member and the stationary member, the first axially polarized magnetic field generating means comprising first and second arcurate members of high magnetic permeability, said first and second arcuate members each comprising a plurality of separate magnetic segments; and a single radial pole assembly for generating a radially polarized magnetic field and being linked magnetically to the rotatable member through an air gap between the thrust disc and a radial pole assembly to provide radial magnetic flux coupling of the rotatable member to the stationary member.

5. The magnetic bearing of claim 4 wherein said axially polarized magnetic field flows through first and second axial poles.

6. The magnetic bearing of claim 4 wherein the magnetic segments comprising said first and arcuate members are affixed to the sides of said first axial pole and magnetic segments comprising said second arcuate members are affixed to the sides of said second axial pole.

7. A magnetic bearing for supporting a rotatable member including integrated thrust and rotor poles positioned with respect to a stationary member comprising:

first magnetic field generating means for generating an axially polarized magnetic field linked magnetically through first and second air gaps between the rotatable member and the stationary member, the first axially polarized magnetic field generating means comprising first and second arcurate members of high magnetic permeability, said first and second arcuate members each comprising a plurality of separate magnetic segments, said axially polarized magnetic field flowing through said first and second axial poles; and a single controllable electromagnetic coil circumferentially positioned about said first and second arcuate members and radially spaced from the rotatable member.

8. The magnetic bearing of claim 7 wherein the magnetic segments comprising said first and arcuate members are affixed to the sides of said first axial pole and magnetic segments comprising said second arcuate members are affixed to the sides of said second pole.

* * * * *